United States Patent
Zlotkin et al.

(10) Patent No.: US 11,509,724 B2
(45) Date of Patent: Nov. 22, 2022

(54) VIRTUAL CONNECTED VEHICLE INFRASTRUCTURE

(71) Applicant: OVO Automotive Ltd., Tel Aviv (IL)

(72) Inventors: Gilad Zlotkin, Mevaseret Zion (IL); Alon Lelcuk, Ramot Meir (IL)

(73) Assignee: Ovo Automotive Ltd., Tel Aviv (IL)

( * ) Notice: Subject to any disclaimer, the term of this patent is extended or adjusted under 35 U.S.C. 154(b) by 55 days.

(21) Appl. No.: 17/028,463

(22) Filed: Sep. 22, 2020

(65) Prior Publication Data

US 2021/0014316 A1 Jan. 14, 2021

Related U.S. Application Data (63) Continuation of application No. PCT/US2020/020314, filed on Feb. 28, 2020.
(Continued)

(51) Int. Cl.
*H04L 67/125* (2022.01)
*B60K 35/00* (2006.01)
(Continued)

(52) U.S. Cl.
CPC .......... *H04L 67/125* (2013.01); *B60K 35/00* (2013.01); *B60W 30/06* (2013.01); *G05D 1/0291* (2013.01); *G06F 9/448* (2018.02); *G06F 21/6218* (2013.01); *G06Q 10/10* (2013.01); *G06Q 20/145* (2013.01); *G07C 5/008* (2013.01); *B60K 2370/126* (2019.05); *B60K 2370/143* (2019.05); *B60K 2370/152* (2019.05); *B60K 2370/157* (2019.05); *B60K 2370/164* (2019.05);
(Continued)

(58) Field of Classification Search
CPC .............. B60K 35/00; B60K 2370/166; B60K 2370/126; B60K 2370/143; B60K 2370/164; B60K 2370/157; B60K 2370/152; G06Q 40/08; G06Q 20/145; G06Q 50/06; G06Q 2240/00; G06Q 30/0284; G06Q 10/10; H04L 67/12; H04L 67/125; H04L 67/10; G07C 5/008; G05D 1/0022; G05D 1/0291
USPC ....................................................... 709/219
See application file for complete search history.

(56) References Cited

U.S. PATENT DOCUMENTS

2015/0178034 A1* 6/2015 Penilla ................. H04L 67/306
345/1.1
2015/0239408 A1 8/2015 Barrett
(Continued)

OTHER PUBLICATIONS

The International Search Report and The Written Opinion of the International Searching Authority for PCT/JS2020/020314, dated Jul. 9, 2020, ISA/RU, Moscow, Russia.

*Primary Examiner* — Frantz B Jean
(74) *Attorney, Agent, or Firm* — M&B IP Analysts, LLC (57) ABSTRACT

A system and method for remote execution of applications for a connected vehicle infotainment system (CVIS). The method comprises establishing a network connection between the CVIS and a cloud server hosted in a cloud computing platform, sending a remote execution request for at least one application, wherein the at least one application is executed by the cloud server, receiving execution results from the at least one application cloud server, and rendering the execution results on the CVIS while allowing interoperability with applications executed over at least one other computing environment included in the vehicle.

19 Claims, 6 Drawing Sheets

Related U.S. Application Data

(60) Provisional application No. 62/812,652, filed on Mar. 1, 2019.

(51) Int. Cl.
| | | |
|---|---|---|
| *G06F 9/448* | (2018.01) | |
| *B60W 30/06* | (2006.01) | |
| *G05D 1/02* | (2020.01) | |
| *G06F 21/62* | (2013.01) | |
| *G06Q 10/10* | (2012.01) | |
| *G06Q 20/14* | (2012.01) | |
| *G07C 5/00* | (2006.01) | |
| *G05D 1/00* | (2006.01) | |
| *G06Q 30/02* | (2012.01) | |
| *G06Q 40/08* | (2012.01) | |
| *G06Q 50/06* | (2012.01) | |

(52) U.S. Cl.
CPC ...... *B60K 2370/166* (2019.05); *G05D 1/0022* (2013.01); *G06Q 30/0284* (2013.01); *G06Q 40/08* (2013.01); *G06Q 50/06* (2013.01); *G06Q 2240/00* (2013.01)

(56) References Cited

U.S. PATENT DOCUMENTS

| | | | |
|---|---|---|---|
| 2016/0009031 A1 | 1/2016 | Reber | |
| 2016/0294614 A1* | 10/2016 | Searle | G06F 8/65 |
| 2017/0078398 A1* | 3/2017 | Haidar | G07C 5/0816 |
| 2018/0307515 A1* | 10/2018 | Meller | G06F 9/45558 |
| 2019/0050217 A1* | 2/2019 | Tatourian | G06F 8/65 |
| 2019/0268420 A1* | 8/2019 | Acharya | G06F 8/658 |

\* cited by examiner

VIRTUAL CONNECTED VEHICLE INFRASTRUCTURE

CROSS-REFERENCE TO RELATED APPLICATIONS

This application is a continuation of International Patent Application No. PCT/US2020/020314 filed on Feb. 28, 2020, now pending, which claims the benefit of U.S. Provisional Application No. 62/812,652 filed on Mar. 1, 2019, the contents of which are hereby incorporated by reference.

TECHNICAL FIELD

The present invention relates generally to connected vehicle infotainment systems (CVIS) and, specifically, to systems and methods for providing executable applications to a vehicle via a link to a cloud-based computing platform.

BACKGROUND

Many modern vehicles, including personal, fleet, and industrial vehicles, include connectivity suites which enable drivers, passengers, and managers to monitor, control, and otherwise connect with a vehicle via a network. Contemporary connectivity solutions may include infotainment (or entertainment) systems, internet communication links, GPS tracking devices, and sensors and actuators. An infotainment system, sometimes known as a head-unit, may include a touchscreen user interface and may be supplied by the vehicle manufacturer or as an aftermarket installation, possibly for purposes of localization. The included internet connection link may be a SIM-based radio modem or a Wi-Fi link for connecting to a Wi-Fi hotspot inside the vehicle. GPS devices may be used for navigation assistance, theft recovery, fleet management, and usage-based insurance. Finally, the sensors and actuators available in a vehicle may include microphones, speakers, push buttons mounted to the steering wheel, displays relating vehicle information such as tire pressure, fuel level, and driving range, and controls for vehicle operation such as the control pedals, door opening buttons, light switches, the vehicle's gear selector system, and the vehicle's steering wheel, among others.

Modern connected vehicles may be configured to include software, embedded locally into a vehicle's computer systems, for facilitating communication with the internet and relaying the vehicle's position to an internet-based system for navigation and theft recovery. In addition, a vehicle, or its driver, may be connected with a behavioral or activity-based insurance program. In the case of such insurance participation, the connected vehicle's computer system, and associated software, may be employed to measure and record sensor and actuator activity including steering wheel rotation, pedal position, gear selection, vehicle speed, accelerometer data, distance-based alerts, and in-vehicle cameras, among others, and to relay this data to the internet, whether in real time or as batched data for a given period or event.

Many computer systems included in modern connected vehicles share common elements. A recurring feature in many connected vehicles, the In-Vehicle Infotainment (IVI) system provides a display screen, accessible by the driver and passengers. In addition, an operating system may be installed on the IVI. The installed operating system may include local embedded applications, each configured to access a subset of vehicle sensors and actuators, allowing the IVI to provide features to users including, as an example, estimations of remaining driving range based on fuel consumption.

In addition to the features native to an IVI, as designed, manufacturers of connected vehicles may include connectivity applications which enhance the functionality of the IVI. Certain popular connectivity applications include features which allow a driver or passenger to connect a smartphone to an IVI and project, mirror, display, or otherwise render smartphone applications through an IVI. Current connectivity packages expand the functionality of a vehicle and its IVI. However, these systems, including IVI hardware and software, are limited in their design by a lack of agility and a lack of longevity.

In the context of connected vehicle computer systems, lack of agility refers to the systems' abilities to receive and integrate patches, fixes, and other like updates. Computer systems, including personal computers, smartphones, and business and industrial systems, may require regular updates to resolve issues relating to features, functions, security, and other aspects of system maintenance. Application of similar updates to vehicle computer systems is limited by regulations concerning security and safety of vehicles, creating hurdles to the receipt and integration of updates in vehicle computer systems. As a result of the lack of agility, and the difficulty of applying necessary updates, vehicle computer systems may lag behind the latest technology in functionality, resilience, and other aspects.

Current solutions to the limitations of vehicle computer and IVI systems include connection of user devices or smart phones to the IVI system, such that the limitations of the device, rather than the limitations of the vehicle, dictate what applications are supported. User device support may be enabled by the use of commercially-available platforms which enable the connection of a mobile phone with a vehicle's IVI system, via USB or Bluetooth. The inclusion of these connectivity platforms enables a user to "mirror" an application running on a user device onto a vehicle's IVI system screen, providing a safe driving experience while interacting with a mobile phone and providing interoperability between vehicles and user devices. Offboard application execution may allow for connection with screens and touchscreens, speakers and microphones, control buttons and knobs, typically on the steering wheel and/or the IVI panel, and GPS data, among others.

In addition to the execution of user device applications, or the rendering of applications executed on user devices, through a vehicle's IVI system, solutions which provide for "mirroring" a cloud-executed application through an IVI system may be of interest in improving IVI systems. This delivery of cloud-executed applications to mobile phone endpoints may be provided as Mobile Device Management (MDM) tools for Enterprise Mobility Management (EMM) solutions for Unified Endpoint Management (UEM), mainly in "Bring Your Own Device" (BYOD) use cases. Virtual Mobile Infrastructure (VMI) techniques may be applicable to data and privacy protection, mobile data security, and improvements to the ease of management of mobile applications. VMI applications may access, via connection with a user's device, device systems such as touch screens, speakers and microphones, GPS systems and data, cameras, and phone orientation and accelerometer systems and data. However, despite the advantages of VMI, systems combining the cloud-based execution of applications with delivery to vehicle IVI systems are presently unavailable.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for remote execution of applications for a connected vehicle infotainment system (CVIS). The method comprises the steps of establishing a network connection between the CVIS and a cloud server hosted in a cloud computing platform; sending a remote execution request for at least one application, wherein the at least one application is executed by the cloud server; receiving execution results from the at least one application cloud server; and rendering the execution results on the CVIS while allowing interoperability with applications executed over at least one other computing environment included in the vehicle.

Certain embodiments disclosed herein also include a non-transitory computer readable medium having stored thereon instructions for causing a processing circuitry to execute a process. The process comprises the steps of establishing a network connection between the CVIS and a cloud server hosted in a cloud computing platform; sending a remote execution request for at least one application, wherein the at least one application is executed by the cloud server; receiving execution results from the at least one application cloud server; and rendering the execution results on the CVIS while allowing interoperability with applications executed over at least one other computing environment included in the vehicle.

In addition, certain embodiments disclosed herein include a system for remote execution of applications for a connected vehicle infotainment system (CVIS). The system comprises a processing circuitry; and a memory, the memory containing instructions that, when executed by the processing circuitry, configure the system to establish a network connection between the CVIS and a cloud server hosted in a cloud computing platform; send a remote execution request for at least one application, wherein the at least one application is executed by the cloud server; receive execution results from the at least one application cloud server; and render the execution results on the CVIS while allowing interoperability with applications executed over at least one other environment included in the vehicle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality.

Some disclosed example embodiments include a technique providing a solution for the connected vehicle agility and longevity problems noted above by delivering connected vehicle applications directly from a cloud computing platform into the IVI system of the connected vehicle. Such that, instead of running an embedded connected vehicle application inside the IVI system, the disclosed embodiments are based on running the connected vehicle application on a remote cloud server while seamlessly delivering the application into the IVI system touch-screen, and other components, as if the application were running natively inside the vehicle.

Figure 1:
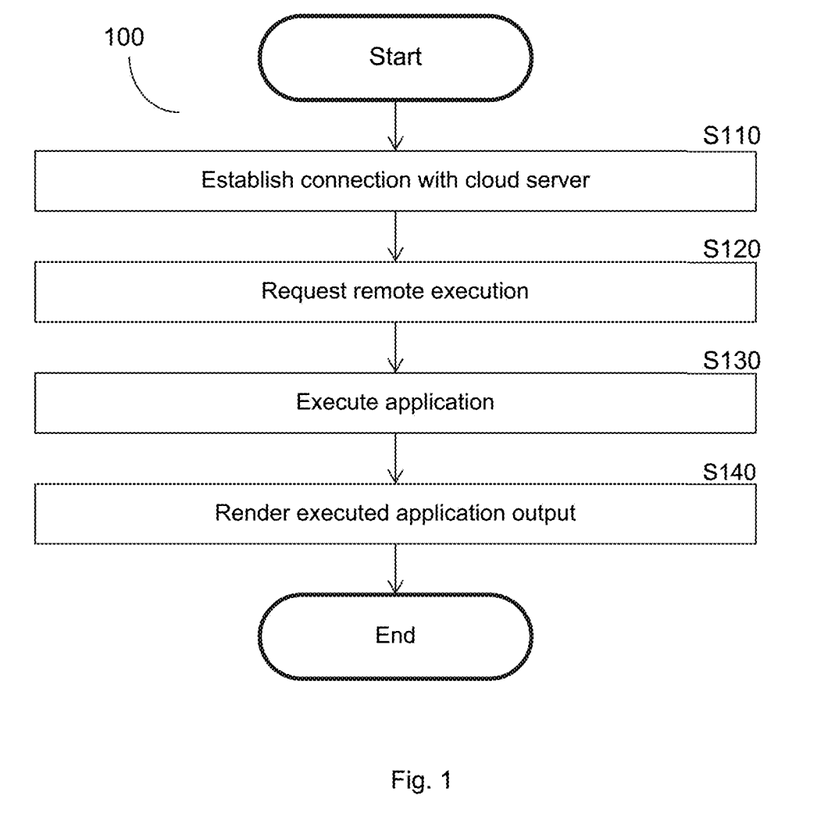
FIG. 1 is an example flowchart illustrating a method for remote execution of applications for a connected vehicle infotainment system, according to an embodiment.

FIG. 1 is an example flowchart 100 illustrating a method for remote execution of applications for a connected vehicle infotainment system, according to an embodiment.

Figure 2:
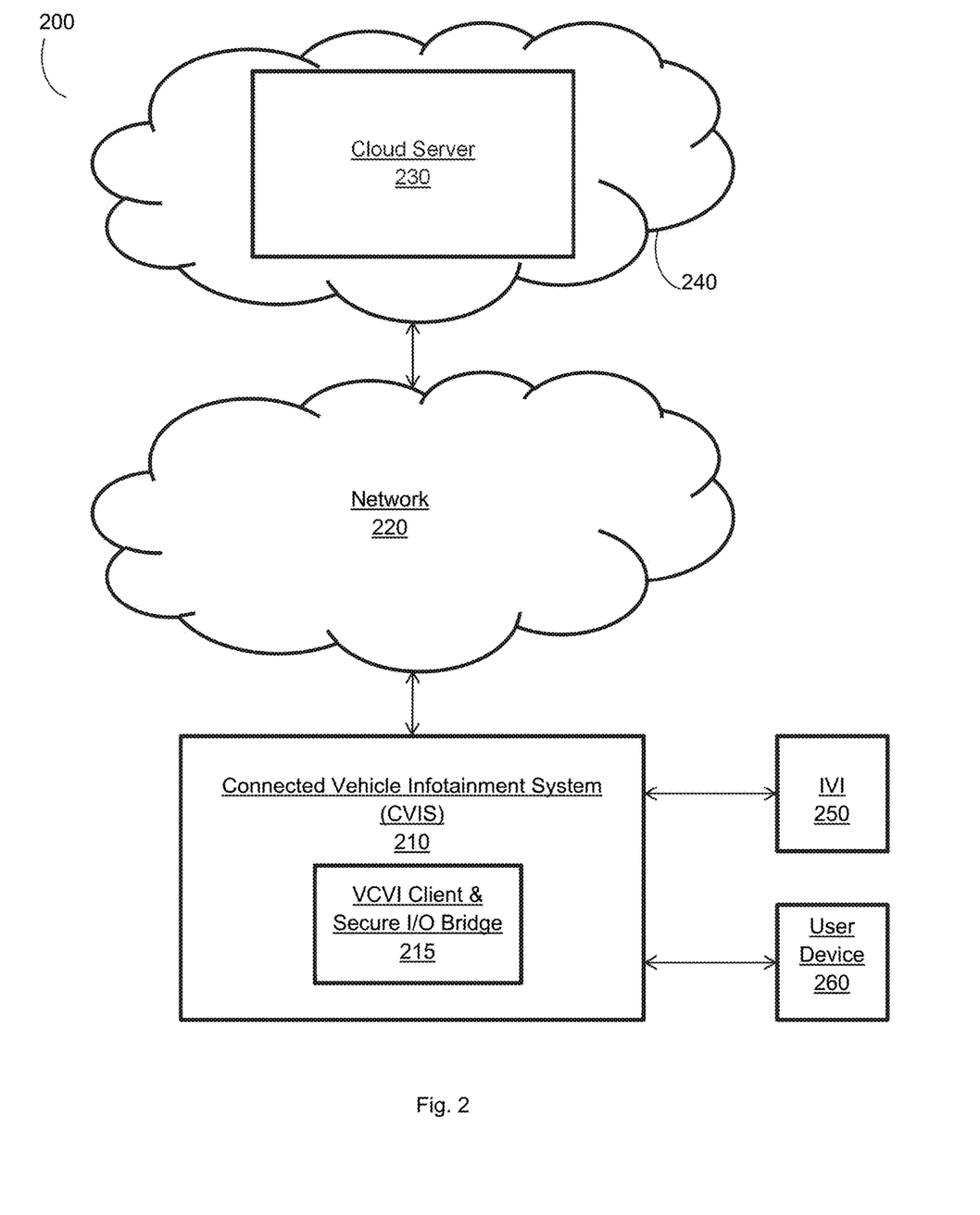
FIG. 2 is an example network diagram utilized to describe remote execution of applications according to various embodiments.

At S110, a connection is established with a cloud server hosted in a cloud computing platform. The connection may be between a cloud server and a CVIS or between a cloud server and a connected user device. The connection may be over one or more networks, as depicted in FIG. 2, below. The connection may be wireless, and may be established through protocols including, without limitation, Wi-Fi, Long-Term Evolution 4G (LTE), satellite, and other wireless protocols.

At S120, remote execution of at least one application is requested. A remote execution request may originate from a device such as, as examples and without limitation, a CVIS, a connected user device, and other, like, devices. A remote execution request may include applications, instructions, and resources stored locally on a CVIS or connected user device, references to applications, instructions, and resources stored on a cloud server, or a combination thereof. A remote execution request may specify one or more cloud servers for execution. The remote execution request may be encrypted or unencrypted, or may be partially encrypted.

At S130, the at least one requested application is executed. During execution, a cloud server or cloud servers may execute one or more applications using the instructions, applications, and resources specified in the remote execution request at S120. The executed application may be the application specified in the remote execution request at S120, a supplemental application providing support for the specified application, or both.

In an embodiment, the application executed may be different from the application specified in the remote execution request at S120, such as where an updated version of an application, or a different application, is preferred. An updated version of an application, or a different application, may be preferred over the application specified in the remote execution request at S120 where the specified application lacks security, hardware compatibility, or other features required by the cloud server, the CVIS or connected user device, or both. Where a preferred application is executed, a user may be notified, prompted for approval, or both. A preferred application may be drawn from a repository local to the cloud server, an online repository hosted remotely, or a connected user device or CVIS, other than the connected user device or CVIS providing the request at S120.

The cloud server may be configured to execute an application in an exact or approximate emulation of a given connected user device or CVIS. Where the cloud server executes applications in an emulation of a connected user device or CVIS, the cloud server may emulate execution environment features including, without limitation, memory and processer restrictions, network interface delays, screen size and resolution, and other, like, features. Where the cloud server executes applications in an emulation of a connected user device or CVIS, the executed application output rendered at S140 may be rendered on a connected user device or CVIS as if the application had executed locally.

In an embodiment, an application execution at S130 may be dynamically roamed to additional cloud servers, connected user devices, CVISs, or any combination thereof. The dynamic roaming of application execution is described in greater detail with respect to FIG. 4, below.

At S140, the executed application output is rendered on the at least one CVIS. In some embodiments, the output may be rendered on a user device connected to a CVIS. The output rendering may include, as examples and without limitation, video/audio and text or image displays on a screen, audio broadcasts through a speaker or headset, or certain network traffic. Where the execution of an application generates outputs such as those described, the remotely-executed application output may be rendered through the connected user device or CVIS as if the application had been executed locally. As an example, where the user interface of a photo editing application is executed remotely and rendered through a CVIS, the CVIS touchscreen may display edited images, tools, and other application features as if the application had executed locally, despite a lack of support for the particular application on the CVIS as manufactured.

The video/audio and other data included in the executed application output may be transmitted to a connected user device or CVIS via the connection established at S110 or via an alternate connection. The connection is a wireless connection established over a protocol such as, as examples and without limitation, Wi-Fi, LTE, satellite, and other, like protocols, and may be encrypted, unencrypted, or partially encrypted. The transmission of executed application outputs is over the established connection.

In an embodiment, application execution at S130 may include user interactivity or other in-render input. Where an application requires post-render or in-render user input, S130 and S140 may occur simultaneously, and user input through the CVIS, connected user device, or both, may be transmitted to the cloud server, using the connection established at S110, the connection used at S140 to deliver the executed application output for rendering, or another connection, as input controlling the execution of the application.

As an example of simultaneous execution and rendering, a cloud-executed navigation application may provide an updated map and directions as a user travels, and may include an interface which allows a user to add destinations to the map and directions during travel by interacting with the CVIS.

It should be noted that the method discussed may be applicable to the execution and delivery of application contents to a CVIS 210 or a connected user device, interchangeably. Alternatively, the information may be provided to both the CVIS and connected user device, simultaneously.

FIG. 2 is an example network diagram 200 utilized to describe remote execution of applications according to various embodiments. The diagram 200 depicts a CVIS 210, including a VCVI Client Secure I/O Bridge 215 (hereinafter an "I/O Bridge"), connected to a cloud server 230, hosted in a cloud computing platform 240, via a network 220. Also connected to the CVIS 210 is one or more user devices 260 and at least one In-Vehicle Infotainment (IVI) system 250. A user device 260 may include a smartphone, a tablet computer, a wearable device, and the like.

Although the diagram 200 depicts a single CVIS 210, connected to a single cloud server 230 through a single network 220, the embodiment depicted does not limit the configurations which may be employed by a system so described. Alternate embodiments may include multiple cloud servers 230, multiple networks 220, multiple CVISs 210, multiple user devices 260, and any combination thereof.

The disclosed embodiments allow interoperability with applications executed in the cloud server 230, applications executed in the CVIS 210, and applications executed in the user device 260. Applications may be rendered on the CVIS's 210 display according to one or more policies. Such policies may be set by a fleet manager, a vehicle maker, and the like.

The CVIS 210 may be a vehicle infotainment system such as, as examples and without limitation, a vehicle stereo head-unit, an integrated smart control system, including features which control vehicle comfort, media, and other settings through a single device, and other, like, systems. The CVIS 210 may include input channels, which may be configured to receive wireless inputs including, without limitation, Wi-Fi, Bluetooth, LTE, and other, like, wireless inputs, wired inputs including, without limitation, USB, Lightning®, 3.5 mm audio, and other, like, wired inputs, and any combination thereof. Further, the CVIS 210 may include output channels which may be configured to output photos or videos for display, to output audio for broadcast, and to perform other, like, functions, including, without limitation, screens, speakers, and other, like, output devices. The CVIS 210 may further include actuators and user input controls such as, as examples and without limitation, switches, buttons, knobs, touchscreens, and other, like, input controls, wherein the actuators and user input controls may be configured to provide user control over features including, without limitation, heating and air conditioning, vehicle windows, audio volume, and other, like, features.

In an embodiment, the CVIS 210 may be a separate component from a dashboard-mounted head unit or control console and may have a form factor such as, as an example and without limitation, a dongle. Where the CVIS 210 is configured to have a form factor other than a dashboard-mounted head-unit or control console, the CVIS 210 may be configured to connect with a user device, dashboard-mounted head-unit or control console, or other device using wireless means including, without limitation, Wi-Fi, Bluetooth, LTE, and other, like, wireless means, wired means including, without limitation, USB, Lightning®, other, like, wired means, and any combination thereof.

Where the CVIS 210 is separate from a dashboard-mounted head unit or control console, the IVI 250 may be configured to provide the functionality necessary for user interaction with the CVIS 210. The IVI 250 may include features such as, without limitation, display screens, speakers, touchscreens, knobs, dials buttons, other, like, input controls, other, like, media devices, and any combination thereof. The IVI 250 may be configured to broadcast, display, or otherwise render audio, video, data, and other content from the CVIS 210. Further, the IVI 250 may be connected to the CVIS 210 directly, through a direct wired or wireless connection, or indirectly, as through a vehicle's central computer or other intermediary. In an embodiment, the IVI 250 may be connected to the CVIS 210 by both direct and indirect means, where said direct and indirect means are described above.

The user device 260 connected with the CVIS 210 may be a smartphone, tablet computer, or other, like, device. In an embodiment, multiple user devices 260 may be connected with a CVIS 210 simultaneously. The user device 260 may be connected with the CVIS 210 by wired means including, without limitation, USB, Lightning®, 3.5 mm audio, other, like, wired means, wireless means including, without limitation, WiFi, Bluetooth, other, like, wireless means, and any combination thereof. In an embodiment, the user device 260 may be configured to store application and user files and may be configured to execute applications, render application outputs, and receive user inputs. The user device 260 may include features such as, as examples and without limitation, a display screen, a touch screen, keys, buttons, other, like, features, and any combination thereof.

The I/O bridge 215 is an embedded application which may be configured to access the network 220. The VCVI client 215 connects, via the network 220, with a VCVI service backend (See FIG. 4, reference 432), embedded in the cloud server 230, where the VCVI service backend 432 runs on a cloud server 230 with a server operating system (See FIG. 4, reference 431).

The cloud server 230 may be hosted in a cloud computing platform 240. The cloud computing platform 240 may include a private cloud, a pubic cloud, and a hybrid cloud. The network 220 may include a wide area network (WAN), a local area network (LAN), a cellular network, other, like, networks, and any combination thereof. In an embodiment, the cloud server 230 may be a physical server, a virtual server, or another, like, server type.

The I/O Bridge 215 may be configured to enforce I/O component, reference 313 in FIG. 3, below, access policies. When an application requests access to any vehicle I/O components 313, the application submits to the VCVI client 215 the application's policy for that specific vehicle model, signed by the vehicle manufacturer. The VCVI client 215 validates the authenticity of the signed policy and grants access to the requested vehicle I/O components 313 while enforcing policy pre-conditions.

In an embodiment, the CVIS 210 and cloud server 230 may be configured to allow for interoperability between connected vehicles and smartphones or other connected devices. Using the embedded VCVI client 215, the CVIS 210 may mirror, on the IVI 250 system touchscreen, an application running on a mobile phone or user device 260.

In an embodiment, where an application is mirrored through the CVIS 210, the application may run in parallel on both the CVIS 210 and the connected user device (shown in FIG. 5), allowing, for example, a user to continue navigating on foot, using the same directions used to navigate by car, after parking and turning off the connected vehicle. In an embodiment, the VCVI client 215 may be configured to connect with an application installed on a mobile phone or other connected user device, allowing for access to VCVI applications through the mobile phone or other user device 260.

Further, where an application is mirrored through the CVIS 210 and runs in parallel on both the CVIS 210 and the connected user device (shown in FIG. 5), the CVIS 210 may be configured to receive input from the user device 260, allowing a user to adjust or control the mirrored application, as rendered on the CVIS 210, from the user device 260. As an example of control of an application rendered on the CVIS 210, from a user device 260, a music application may be executed in a cloud server 230 and rendered through the CVIS 210, as described, and may accept inputs from a user device 260, allowing a user sitting in a rear passenger seat to adjust the music application without physically interacting with the CVIS 210.

Applications executed through the VCVI may access features and data including, without limitation, the vehicle's screen and touchscreen, speakers and telephone, control buttons and knobs, cameras, GPS data, other sensors, actuators, other, like, components, and any combination thereof.

In an embodiment, each VCVI remote application running on the cloud server 230 may have read privileges, write privileges, or both, to different vehicle sensors and actuators. Privileges and access may be conditioned on certain pre-requisites. The VCVI client may be configured to validate pre-requisite conditions during, or prior to, application access.

The VCVI access control policies may include policies such as, without limitation, navigation application access control policies, usage-based insurance application access control policies, parking payment application access control policies, fueling payment application access control policies, driverless self-parking application access control policies, and other, like, policies.

Navigation application access control policies may govern a given navigation application's ability to read and write touchscreen contents, to read vehicle GPS data, to read current fuel tank level data, to read microphone data, to read speak button data, and to read control knob input data, among others.

Usage-based insurance access control policies may govern an insurance application's ability to read data, in order to monitor driving patterns and behaviors, from a vehicle's GPS, camera, and steering, brake, and acceleration systems, among others.

A parking payment application access control policy may govern a parking payment application's ability to read and write touchscreen contents and data to determine when a vehicle is parking and to read vehicle GPS data, among others.

A fueling payment application access control policy may govern a fueling payment application's ability to read and write touchscreen contents and data to determine when a vehicle is parking, to read a vehicle's GPS data, and to read a vehicle's camera data, among others.

A driverless self-parking application access control policy may govern a self-parking application's ability to read and write steering, brake, and acceleration data under a given speed, such as 3 Km/h and in pre-approved locations, to read vehicle GPS data, to read vehicle camera data, and to read and write light and horn data, in order to enable control of the lights and horn, among other, like, abilities.

A vehicle access control policy may be provided and signed by a vehicle maker for each VCVI application. Where an application requests access to vehicle resources, sensors, or actuators, the application may submit its policy, for the specific vehicle, as signed by the manufacturer, to the VCVI client 215. Where the VCVI client 215 validates the authenticity of the policy, the application may be executed under certain pre-conditions, as enforced by the VCVI client 215. An example of an execution pre-condition is provided below with respect to a geographic limitation placed on application execution.

In an embodiment, the application's signed policy may be implemented using blockchain technology. In such an implementation, a vehicle's manufacturer may authorize certain third parties, such as a vehicle's dealer, to grant access privileges to certain vehicle resources, sensors, and actuators under certain preconditions.

As an example of third-party authorization, including application of pre-condition limitations, a car manufacturer may provide dealers which are local to a country with privileges authorizing, for example, read and write access for a vehicle's touchscreen, as well as read privileges for certain other components, as long as the vehicle is located within the country. In the example described, the access control policy submitted by an application to the VCVI client 215 may include a chain of authorizations and policies, ascribed to a blockchain-style ledger or token, for validation and enforcement by the VCVI client 215.

Figure 3:
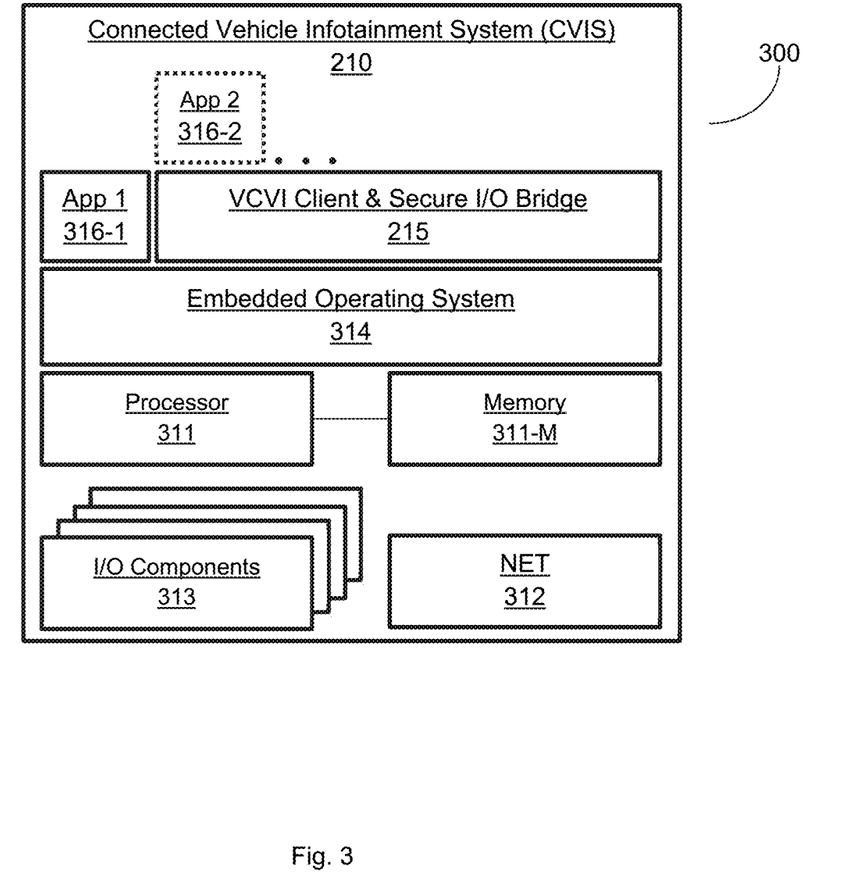
FIG. 3 is a block diagram depicting the CVIS, arranged according to an embodiment.

FIG. 3 is an example block diagram depicting the CVIS 210, arranged according to an embodiment. The CVIS 210 includes a processor 311 coupled to a memory 311-M, a network interface 312, and other I/O components 313 such as screens, touch screens, microphones, speakers, buttons and knobs, GPS sensors, and other sensors and actuators, which may be disposed at various locations throughout the vehicle.

The CVIS 210 may run an embedded operating system 314 (such as QNX, GENIVI, AGL, Android®, or another type of vehicle infotainment embedded operating system), which is connected to the network 320 via the NET I/O interface 312 and which is configured to manage I/O components 313.

The operating system 314 may be configured to execute embedded applications, such as, for example, App1 316-1, as depicted. Such embedded applications may be configured to interact with any I/O component 313 and may also be configured for connection to the network 220, doing so through the operating system 314 in both described implementations. For example, App1 316-1 may be a navigation application which accesses a GPS sensor, wherein a GPS sensor may be an I/O component 313, which is connected to the network 220. In another example, App1 316-1 may be an HVAC control application which connects to temperature sensors and vehicle HVAC system actuators.

Figure 4:
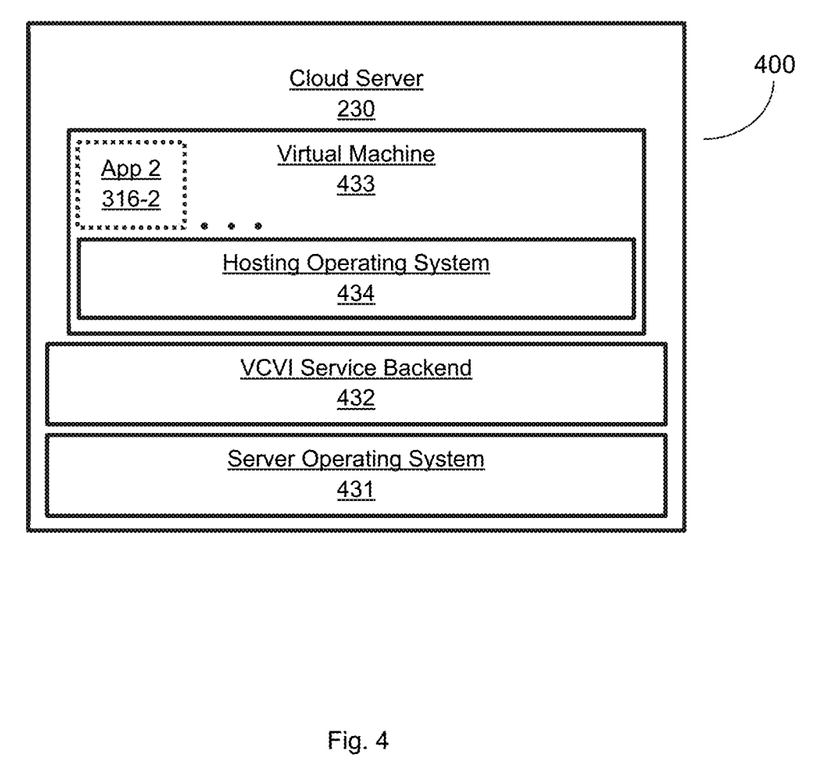
FIG. 4 is a block diagram depicting the cloud server, according to an embodiment.

FIG. 4 is an example block diagram depicting the cloud server 230, according to an embodiment. The cloud server 230 includes a server operating system 431, a VCVI service backend 432, and a virtual machine 433, where the virtual machine 433 includes a hosting operating system 434. In an embodiment, the virtual machine 433 may be configured to execute one or more applications such as, as an example and without limitation, App2 316-2.

The VCVI service backend 432 is configured to manage one or more virtual machines (VM) 433. Each VM 433 may be configured to execute a hosting operating system 434. The hosting operating system 434 may be an operating system common to vehicle infotainment systems, (e.g. QNX, GENIVI, AGL, a flavor of Android®, and other types of vehicle infotainment embedded operating systems). However, the hosted operating system 434 is not limited to such vehicle infotainment embedded operating systems and may be any other operating system that is capable of executing connected vehicle applications.

The hosted operating system 434 may be of a different type than the embedded operating system 314. For example, the embedded operating system 314 may be GENIVI while the hosting operating system 434 may be Android®, or vice versa. Therefore, App2 316-2 may be, for example, an Android application that the VCVI solution is "mirroring" into the vehicle infotainment system through the VCVI client 215, such that App2 316-2 can use I/O components 313 such as a touchscreens, speakers, microphones, or other I/O components 313 permitted by the vehicle manufacturer. The user experience for App2 316-2 inside the vehicle may be similar to, or identical to, the experience of using an embedded application.

In an embodiment, the VCVI service backend 432 may be configured to dynamically roam between cloud servers 230, employing a process known as dynamic service roaming. Stateful dynamic service roaming may be affected to support latency optimization, load balancing, and fault resilience.

Dynamic service roaming may be applicable to the optimization of latency for communications to and from connected vehicles. As connected vehicles travel, network-switching operations may allow for the creation of a stronger, faster, or otherwise preferred signal or connection between a connected vehicle and a cloud server 230. The VCVI service backend 432 may be configured to optimize service performance by switching a vehicle's connection to that cloud server 230 "closest" to the connected vehicle. The determination of a "closest" cloud server 230 may include, without limitation, considerations of signal strength, connection time or latency, vehicle resources, server resources, operations in progress or anticipated, other, like factors, and any combination thereof. In an embodiment, a cloud server 230 switch roaming event may be transparent to occupants of a vehicle, allowing the process to occur automatically and without creating a notification.

In an embodiment, dynamic service roaming may be applicable to the enforcement of load-balancing policies or procedures. As a cloud server 230 may be configured to serve multiple connected vehicles at once, the resources, process schedules, or other elements of a given cloud server 230 may become overloaded by the number of connected vehicles, the resource demands of processing tasks, and other factors. The VCVI service backend 432 implementation or implementations may be configured to reduce loads on overloaded cloud servers 230 by applying dynamic service roaming to relocate the processing demands for certain vehicles or processing tasks from overloaded cloud servers 230 to underloaded cloud servers 230.

In an embodiment, the determination of cloud server 230 loading may include consideration of factors including, without limitation, the number, location, and type of processing tasks associated with connected vehicles, the number, location, and available resources of connected cloud servers 230, anticipated processing loads, anticipated vehicle travel patterns, historic data, vehicle I/O data, other, like, information, and any combination of these factors.

Dynamic service roaming may have further applicability in the management of fault resilience policies. As processing effected via a cloud server 230 contains the risk of error, arising from sources including, as examples and without limitation, corrupt resource files from a user device or connected vehicle, cloud server 230 errors or unavailability, and data corruption during transmission to or from the cloud server 230, among others, dynamic service roaming may be applicable to provide fault resilience.

In an embodiment, the VCVI service backend 432 implementation or implementations may be configured to ensure fault resilience by applying dynamic service roaming to relocate processing demands or resource requests to one or more servers, racks, or datacenters, where the one or more servers, racks, or datacenters may not be optimal with respect to the vehicle or processing demand and may not be necessary, without considering fault resilience, to effect the processing demand supplied. The dynamic service roaming of processing demands to separate servers, racks, and datacenters may be proactive, occurring without detection of a fault, in order to provide parity, or may be reactive, occurring after the detection of a fault, in order to rectify the fault detected.

In an embodiment, dynamic service roaming may be applied to relocate the VCVI service backend 432 into the connected vehicle. Where a vehicle is entering a region known to have poor wireless connectivity, where a known, upcoming, storm or weather event may interrupt connectivity, or where interruption of the connection between the vehicle and the cloud server 230 is anticipated for another reason, dynamic service roaming of certain applications for execution within the connected vehicle may allow for improved overall application performance and continued application availability in the event of disconnection from the cloud server 230. Where the CVIS 210 includes, side-by-side with the VCVI client 215, a virtual machine running a micro-instance of the backend service delivery system, capable of hosting applications, dynamic roaming of the VCVI service backend 432 into the CVIS 210 may be achieved.

Figure 5:
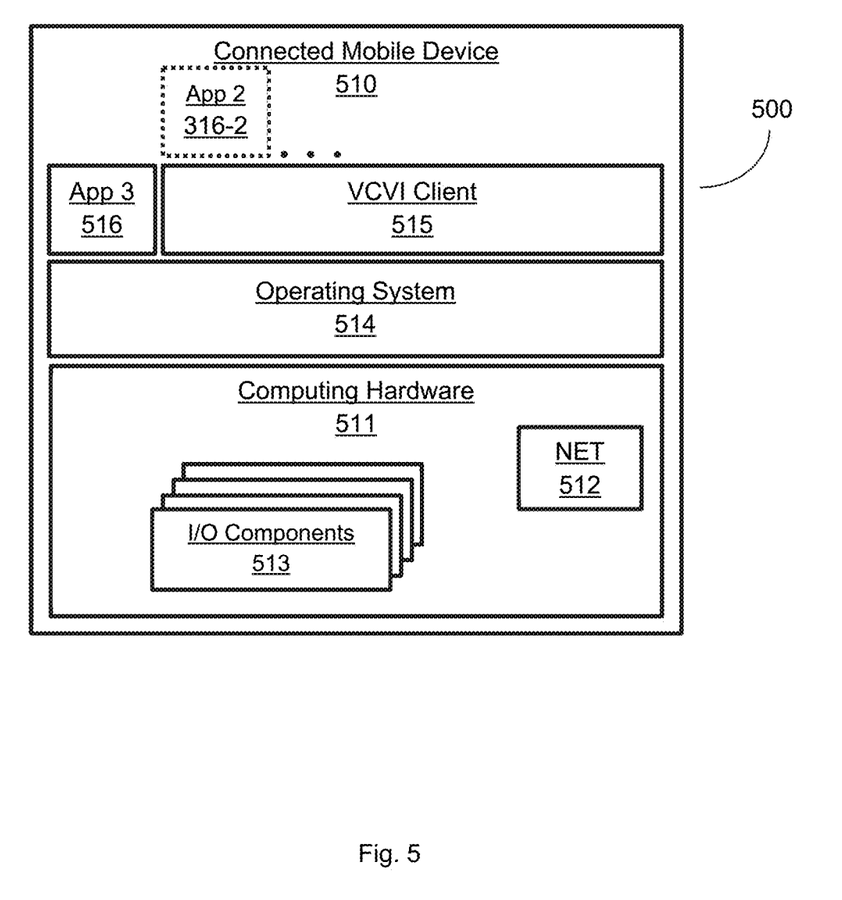
FIG. 5 is a block diagram depicting a detail view of a connected mobile device (CMD), including components, according to an embodiment.

FIG. 5 is an example block diagram 500 depicting a detail view of a connected mobile device (CMD), including components, according to an embodiment. The block diagram 500 shows a connected mobile device 510, including computing hardware 511, a network interface 512, and other I/O components 513 such as touchscreens, microphones, speakers, GPS sensors, and other sensors. The connected mobile device 510 may run an operating system 514 (such iOS®, Android®, and other types of mobile device embedded operating systems) which may connect to the network 220 via the NET I/O interface 512 and which may manage the I/O components 513 described, among others.

In an embodiment, the operating system 514 may be configured to execute embedded applications such as, for example, App3 516, as depicted. Such embedded applications may, through the operating system 514, interact with any I/O component 513 and connect to the network 220. For example, App3 516 may be a messaging application which accesses I/O components 513, such as a touchscreen, microphone, and speaker, and which is connected to the network 220.

The VCVI Client 515 is an application embedded side-by-side with other embedded applications, applications which also have access to the network 220 and all I/O components 513 on that mobile device, as permitted by the user of the device. The VCVI Client 515 may be connected, via the network 220, with exactly the same VCVI service backend 432 which is able to "mirror" the same App2 316-2 instance to the connected mobile device 510, independently of the type of operating system 514 on the connected mobile device 510. For example, the connected mobile device 510 may run iOS® while App2 316-2 can be an Android® application running on a hosted Android® operating system. As mentioned above, such applications, for example, App2 316-2, may also be "mirrored" to a CVIS 210 that is running an embedded OS that is different (e.g. GENIVI) from the connected mobile device 510 operating system 514.

Figure 6:
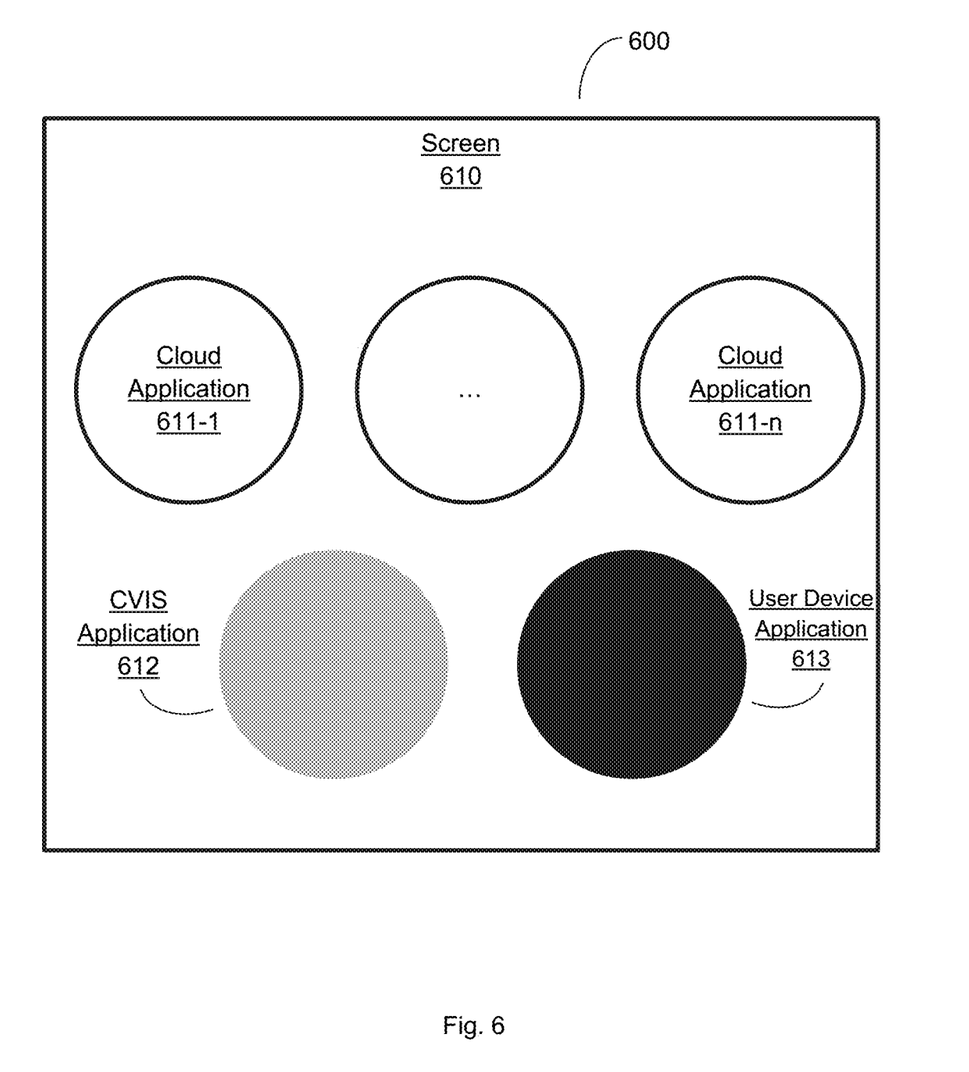
FIG. 6 is an illustration depicting multiple applications from different sources rendered simultaneously on a single interface, according to an embodiment.

FIG. 6 is an illustration 600 depicting multiple applications from different sources rendered simultaneously on a single interface, according to an embodiment. In an embodiment, a CVIS may be configured to simultaneously display, broadcast, or otherwise render the outputs of multiple applications simultaneously. The applications rendered simultaneously may be cloud applications, 611-1 through 611-n, executed through a cloud server 230, CVIS applications 612, executed through a CVIS 210, user device applications 613, executed through a user device 260, and any combination thereof. In the example embodiment, multiple application outputs from various sources are rendered through a vehicle's screen 610. The screen 610 may be a part of a CVIS 210, an IVI 250, or may be a standalone component. In an embodiment, applications may be rendered based on the application of one or more policies.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for remote execution of applications for a connected vehicle infotainment system (CVIS) comprising:
   establishing a network connection between the CVIS and a cloud server hosted in a cloud computing platform;
   sending a remote execution request for at least one application, wherein the at least one application is executed by the cloud server;
   receiving execution results from the at least one application cloud server; and
   rendering the execution results on the CVIS while allowing interoperability with applications executed over at least one other environment included in the vehicle.

2. The method of claim 1, wherein the at least one other computing environment includes at least one user device connected to the CVIS and in-vehicle infotainment (IVI) integrated in the CVIS.

3. The method of claim 1, wherein the remote execution is based on at least a first policy defined with CVIS.

4. The method of claim 3, wherein the rendering of the execution output is based on a second policy defined with CVIS.

5. The method of claim of 4, wherein each of the first policy and second policy includes any one of: a navigation application access control policy, a usage-based insurance application access control policy, a parking payment application access control policy, a fueling payment application access control policy, and a driverless self-parking application access control policy.

6. The method of claim 4, wherein the first and second policy are enforced by a VCVI client secure I/O bridge embedded in the CVIS.

7. The method of claim 4, wherein each of the first policy and the second policy are different for each of the at least one application.

8. The method of claim 4, wherein the first policy and second policy are defined and signed by at least one of: a vehicle maker, a fleet manager, or a dealer.

9. The method of claim 4, further comprising:
   re-rendering the execution results in response to a user input.

10. A non-transitory computer readable medium having stored thereon instructions for causing a processing circuitry to execute a process for remote execution of applications for a connected vehicle infotainment system (CVIS) comprising:
    establishing a network connection between the CVIS and a cloud server hosted in a cloud computing platform;
    sending a remote execution request for at least one application, wherein the at least one application is executed by the cloud server;
    receiving execution results from the at least one application cloud server; and
    rendering the execution results on the CVIS while allowing interoperability with applications executed over at least one other environment included in the vehicle.

11. A connected vehicle infotainment system, comprising:
    a processing circuitry; and
    a memory, the memory containing instructions that, when executed by the processing circuitry, configure the system to:
    establish a network connection between the CVIS and a cloud server hosted in a cloud computing platform;
    send a remote execution request for at least one application, wherein the at least one application is executed by the cloud server;
    receive execution results from the at least one application cloud server; and
    render the execution results on the CVIS while allowing interoperability with applications executed over at least one other environment included in the vehicle.

12. The system of claim 11, wherein the at least one other computing environment includes at least one user device connected to the CVIS and in-vehicle infotainment (IVI) integrated in the CVIS.

13. The system of claim 11, wherein the remote execution is based on at least a first policy defined with CVIS.

14. The system of claim 13, wherein the system is further configured to:
    render the execution output is based on a second policy defined with CVIS.

15. The system of claim of 14, wherein each of the first policy and second policy includes any one of: a navigation application access control policy, a usage-based insurance application access control policy, a parking payment application access control policy, a fueling payment application access control policy, and a driverless self-parking application access control policy.

16. The system of claim 14, wherein the first and second policy are enforced by a VCVI client secure I/O bridge embedded in the CVIS.

17. The system of claim 14, wherein each of the first policy and the second policy are different for each of the at least one application.

18. The system of claim 14, wherein the first policy and second policy are defined and signed by the vehicle maker, the fleet manager, or the dealer.

19. The system of claim 14, wherein the system is further configured to:
    re-render the execution results in response to a user input.

* * * * *